(12) United States Patent
Andres

(10) Patent No.: US 12,376,507 B2
(45) Date of Patent: Aug. 5, 2025

(54) SCRAPER DEVICE FOR A DISC OF AN AGRICULTURAL MACHINE AND ASSOCIATED AGRICULTURAL MACHINE

(71) Applicant: KUHN SAS, Saverne (FR)

(72) Inventor: Christophe Andres, Waldolwisheim (FR)

(73) Assignee: KUHN SAS, Saverne (FR)

( * ) Notice: Subject to any disclaimer, the term of this patent is extended or adjusted under 35 U.S.C. 154(b) by 792 days.

(21) Appl. No.: 17/696,080

(22) Filed: Mar. 16, 2022

(65) Prior Publication Data

US 2022/0295682 A1    Sep. 22, 2022

(30) Foreign Application Priority Data

Mar. 18, 2021    (FR) ..................... 21 02729

(51) Int. Cl.
*A01B 15/16* (2006.01)
*A01B 23/06* (2006.01)
*A01B 49/06* (2006.01)
*A01B 71/08* (2006.01)
(Continued)

(52) U.S. Cl.
CPC .............. *A01B 15/16* (2013.01); *A01B 23/06* (2013.01); *A01B 49/06* (2013.01); *A01B 71/08* (2013.01); *A01C 5/064* (2013.01); *A01C 7/08* (2013.01)

(58) Field of Classification Search
CPC ........... A01B 7/00; A01B 15/00; A01B 15/16; A01B 23/06; A01B 21/08; A01B 71/08; A01C 5/00

USPC ....... 172/558, 559, 560, 561, 562, 563, 564, 172/566
See application file for complete search history.

(56) References Cited

U.S. PATENT DOCUMENTS

| 718,825 | A |   | 1/1903 | Davis |
|---|---|---|---|---|
| 1,203,156 | A | * | 10/1916 | Sturrock ................ A01C 5/064 |
|   |   |   |   | 172/566 |
| 1,545,895 | A |   | 7/1925 | Hamilton |

(Continued)

OTHER PUBLICATIONS

French Preliminary Search Report issued Dec. 1, 2021 in French Application 21 02729 filed on Mar. 18, 2021, 10 pages (with English Translation of Categories of Cited Documents & Written Opinion).

*Primary Examiner* — Christopher J Sebesta
*Assistant Examiner* — Evan A Bregel
(74) *Attorney, Agent, or Firm* — Oblon, McClelland, Maier & Neustadt, L.L.P.

(57) ABSTRACT

A scraper device for a disc of an agricultural machine includes: a first outer scraper element having a first scraper portion resting against the outer surface of the first disc and a first coupling portion coupled to a chassis; a first inner scraper element having a second scraper portion resting against the inner surface of the first disc and a second coupling portion coupled to the first coupling portion, the first inner scraper element swivel-mounted with respect to the first outer scraper element around a second rotation axis; and a resetting device connected to the second coupling portion causing a rotational movement of the first inner scraper element along the second rotation axis pressing the second scraper portion against the inner surface of the first disc and causing rotational movement of the first outer scraper element along the first rotation axis pressing the first scraper portion against the first disc.

6 Claims, 8 Drawing Sheets

(51) Int. Cl.
*A01C 5/06* (2006.01)
*A01C 7/08* (2006.01)

(56) References Cited

U.S. PATENT DOCUMENTS

| | | |
|---|---|---|
| D892,177 S | 8/2020 | McLuckie et al. |
| 2014/0216771 A1* | 8/2014 | Bassett .................. A01C 5/064 |
| | | 172/150 |
| 2020/0267882 A1* | 8/2020 | McLuckie ................ A01B 5/04 |
| 2020/0315080 A1 | 10/2020 | McLuckie et al. |

* cited by examiner

SCRAPER DEVICE FOR A DISC OF AN AGRICULTURAL MACHINE AND ASSOCIATED AGRICULTURAL MACHINE

BACKGROUND OF THE INVENTION

Field of the Invention

The present invention relates to the field of scraper devices for a disc of an agricultural machine and the field of agricultural machines.

Description of the Related Art

Agricultural machines, of the agricultural seeder type, are generally equipped with discs to open up the soil and form at least one furrow in which one or several seeds will subsequently be deposited. These discs usually work in pairs on each sowing line or row and are oriented in a V-shape to open up the soil; they are often referred to as furrow opening discs.

These discs are usually used in the two main categories of seeders, namely seeders for grains, such as, for example, wheat, barley, rapeseed, etc., also known as seed drills, and single-grain seeders, for example for maize, beet, etc., also known as precision seed drills or row seed drills.

Since these discs have to work in different types of soil, for example, chalky, clayey, etc., and under different conditions depending on the amount of debris, humidity, seeding speed, etc., they often accumulate soil. This is because the soil comes to stick to the discs, which prevents them from working properly. The drawbacks of this are that the rotation of the discs can be blocked and/or clumps of soil can prevent good soil penetration, etc.

Poor functioning of the furrow opening discs implies poor implantation of the seed. The seed is not planted at the right depth or is planted in a poorly opened furrow. These drawbacks lead to a deterioration of the quality of sowing and therefore of the subsequent harvest, since not all the seeds sown will emerge or else not in an optimal manner.

In order to overcome these drawbacks, scraper elements exist, which are used to keep the discs clean and to avoid soil build-up and clogging.

Such scraper elements can only be fitted on the outside or only on the inside of the discs, with one scraper element per disc. Alternatively, such scraper elements can be fitted on the inside and on the outside for greater efficiency, with two scraper elements per disc.

Some scraper elements are manufactured in one piece and must be replaced as a whole, like a wear part, others have removable parts, those in contact with the disc, for easier and more economical replacement. These wear parts can be made of rubber or metal.

The scraper element must therefore be in contact with the disc in order to be effective but must not press too hard against it so as to avoid excessive friction and premature wear.

Due to this permanent contact, the wear of the scraper element means that it can lose its effectiveness over time if contact with the disc is no longer guaranteed.

The adjustment of a scraper element can be carried out by adjusting the pressure, for example, by means of a spring, or by adjusting the position of the scraper element, for example, by means of fastening plates with holes. Scraper elements are rarely adjusted, apart from their replacement, because this operation is tedious for the farmer due to their number. The goal is to have uniform adjustment on all discs under all conditions that is simple to set up. Practice is therefore to maintain this adjustment until it is observed that the scraper elements are not working as well, for example, because the farmer visually observes a poorer quality of work, and need to be changed.

The US2020/0267882A1 publication describes a scraper set that comprises a first outer scraper element resting against the outer surface of a first disc, a first inner scraper element resting against the inner surface of the first disc, a second outer scraper element resting against the outer surface of a second disc, a second inner scraper element resting against the inner surface of the second disc. Furthermore, the scraper set comprises a spring that comprises a first end connected to the first outer scraper element to press the first outer scraper against the first disc, and a second end connected to a second outer scraper element. This spring makes it possible to press the first outer scraper element so as to press the second outer scraper against the second disc. Furthermore, the scraper set comprises a first conical spring to press the first inner scraper against the first disc, and a second conical spring to press the second inner scraper against the second disc. However, this scraper set has the drawback of being complex to adjust, since it is necessary to adjust the pressure of at least three springs.

SUMMARY OF THE INVENTION

The present invention is intended to overcome at least one of these drawbacks and aims to provide a solution to facilitate the adjustment of the scraper elements.

To this end, the present invention concerns a scraper device for at least one disc of an agricultural machine, comprising at least:
- a first set for a first disc, comprising an outer surface and an inner surface, with the first set comprising at least:
- a first outer scraper element comprising at least one suitable first scraper portion intended to rest against at least one part of the outer surface of the first disc, and one suitable first coupling portion intended to be mechanically coupled to at least one chassis of the agricultural machine through first coupling means, with the first suitable outer scraper element intended to be swivel-mounted with respect to the chassis around a first rotation axis A1 through the first coupling means;
- a first inner scraper element comprising at least one suitable second scraper portion intended to rest against at least one part of the inner surface of the first disc, and one suitable second coupling portion intended to be coupled to the first coupling portion of the first outer scraper element through second coupling means;
- the first inner scraper element being swivel-mounted with respect to the first outer scraper element around a second rotation axis A2 by the second coupling means;
- a second set for a second disc comprising an outer surface and an inner surface, with the second set comprising at least:
- a second outer scraper element comprising at least one suitable third scraper portion intended to rest against at least one part of the outer surface of the second disc, and one suitable third coupling portion intended to be mechanically coupled to at least the chassis of the agricultural machine through third coupling means, with the suitable first outer scraper element intended to be swivel-mounted with respect to the chassis around a third rotation axis A3 through the third coupling means;
- a second inner scraper element comprising at least one suitable fourth scraper portion intended to rest against at least one part of the inner surface of the second disc, and one suitable fourth coupling portion intended to be coupled to the third coupling portion of the first outer scraper element through fourth coupling means;

the second inner scraper element being swivel-mounted with respect to the second outer scraper element around a fourth rotation axis A4 through the fourth coupling means;

the scraper device is characterized in that it comprises:

a resetting means connected by a first end to the second coupling portion and by a second end to the fourth coupling portion;

in that the resetting means is configured to cause a rotational movement of the first inner scraper element along the second rotation axis A2, so as to press the second scraper portion against the inner surface of the first disc and to cause a rotational movement of the first outer scraper element along the first rotation axis A1 to press the first scraper portion against the outer surface of the first disc;

in that the resetting means is configured to cause a rotational movement of the second inner scraper element along the fourth rotation axis A4, so as to press the fourth scraper portion against the inner surface of the second disc and to cause a rotational movement of the second outer scraper element along the third rotation axis A3 to press the third scraper portion against the outer surface of the second disc.

The invention also concerns an agricultural machine comprising at least:
- a first disc;
- a chassis;
- at least one scraper device;
- the agricultural machine is characterized in that the scraper device complies with the invention.

BRIEF DESCRIPTION OF THE DRAWINGS

The invention will be better understood through the following description, which refers to several preferred embodiments given as non-limiting examples and explained with reference to the attached schematic drawings, in which.

DETAILED DESCRIPTION OF THE PREFERRED EMBODIMENTS

Figure 6:
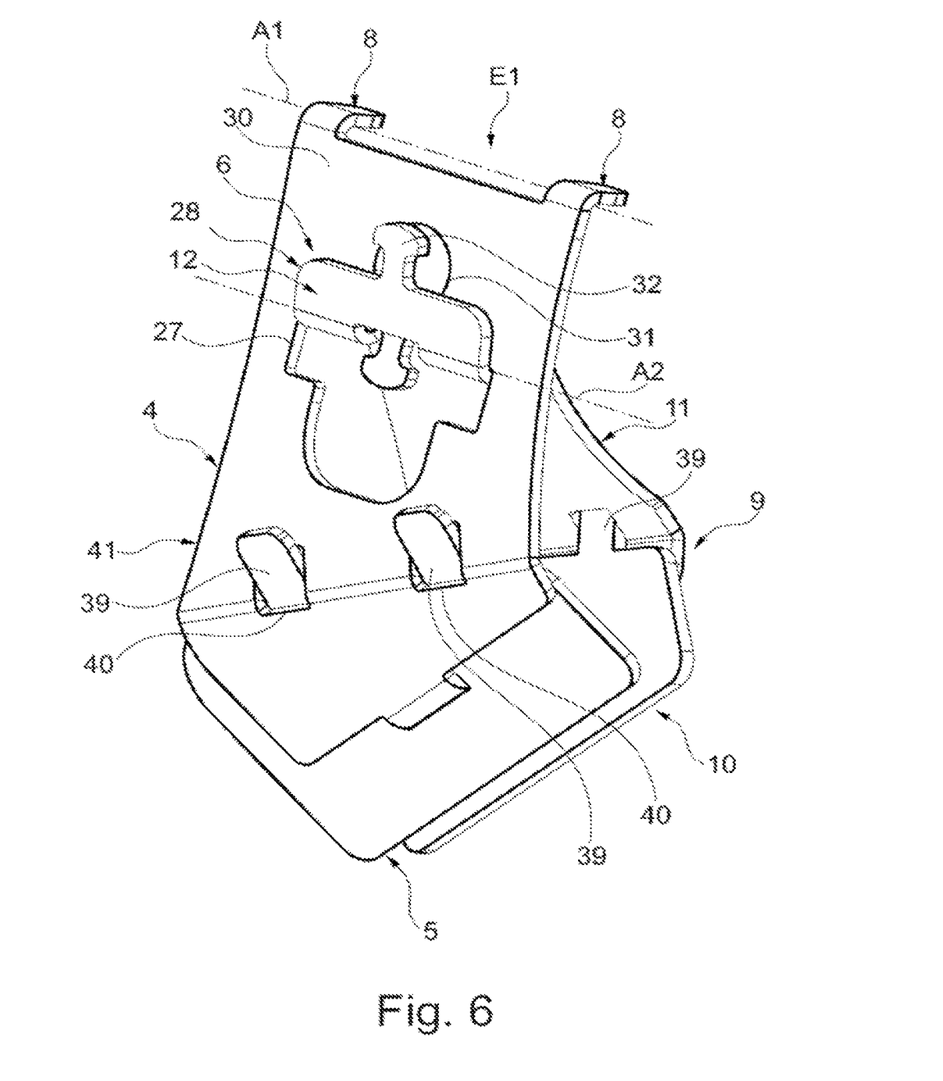
FIG. 6 shows a perspective view of a first scraper set of the scraper device according to the invention.
Figure 7:
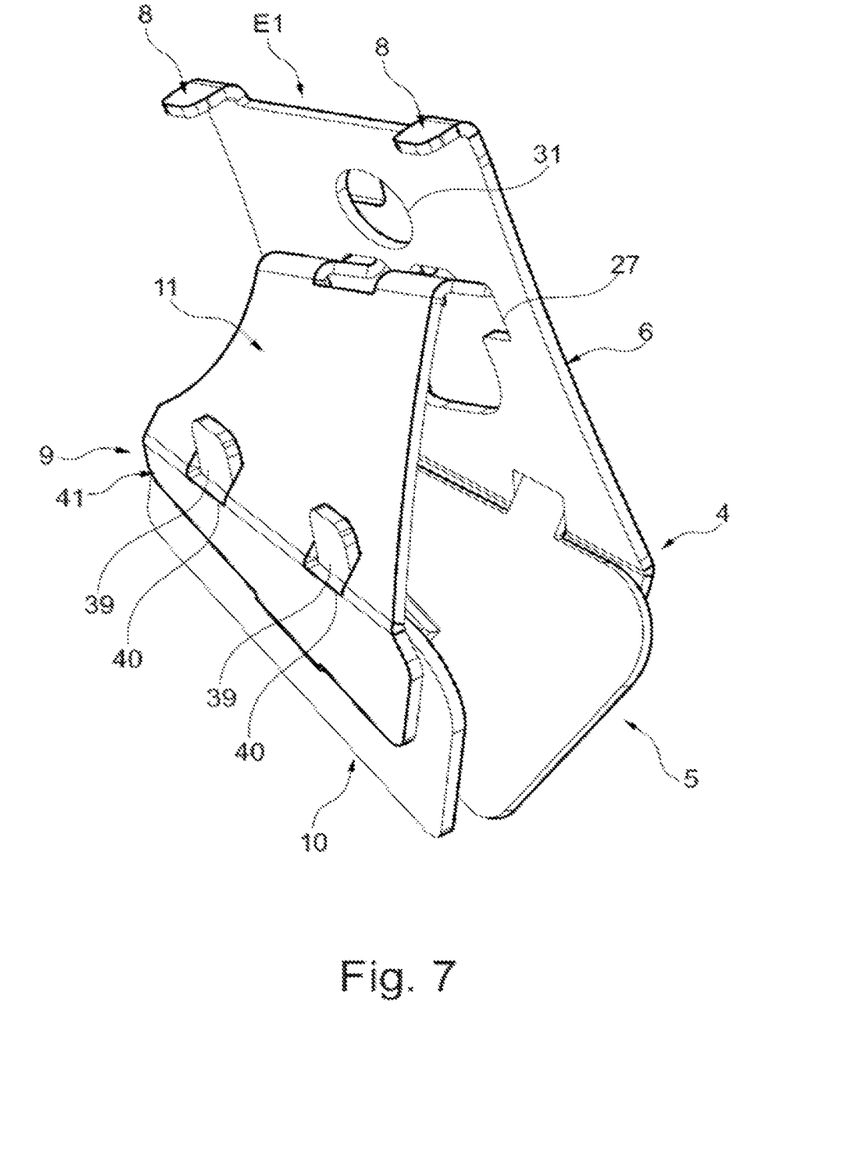
FIG. 7 shows a perspective view of a first scraper set of the scraper device according to the invention.
Figure 8:
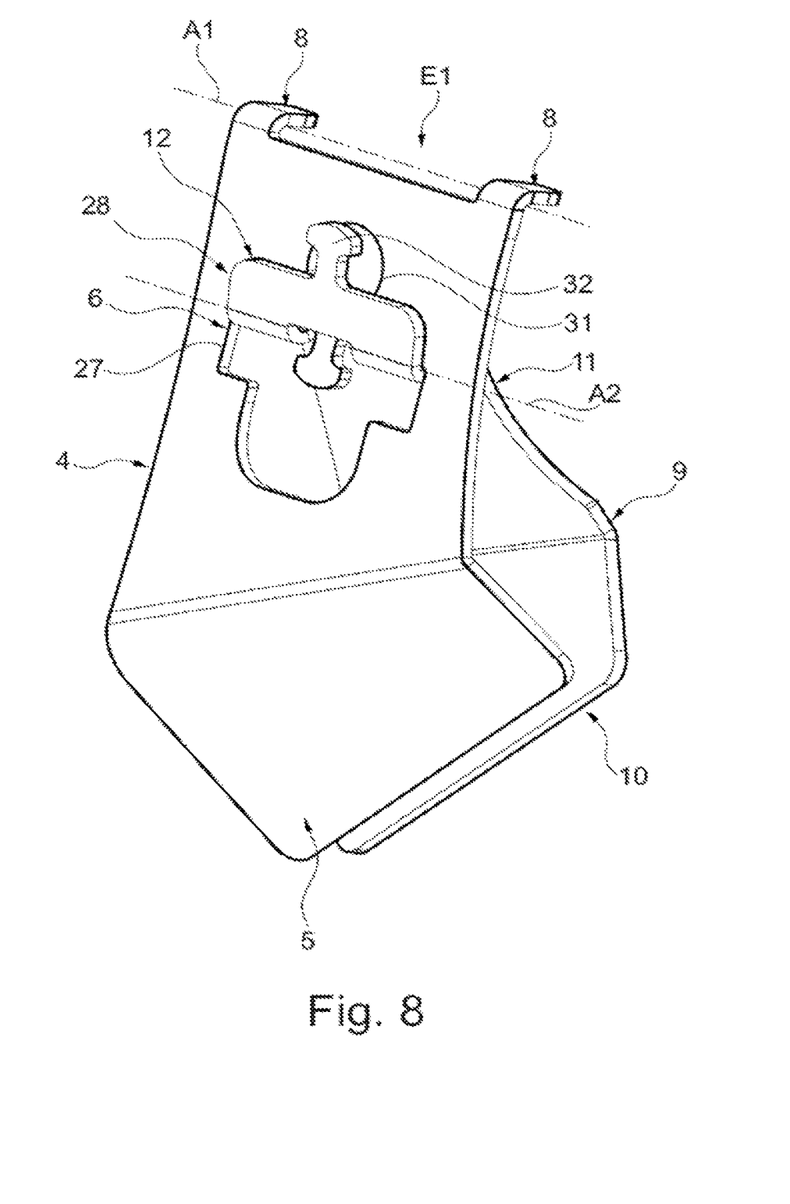
FIG. 8 shows a perspective view of a first scraper set of the scraper device according to an alternative according to the invention.

A scraper device for at least one disc of an agricultural machine comprises at least:

a first set E1 for a first disc 1 comprising an outer surface 2 and an inner surface 3, with the first set E1 comprising at least (FIGS. 6 to 8):

a first outer scraper element 4 comprising at least one suitable first scraper portion 5 intended to rest against at least one part of the outer surface 2 of the first disc 1, and one suitable first coupling portion 6 intended to be mechanically coupled to at least one chassis 7 of the agricultural machine through first coupling means 8, with the suitable first outer scraper element 4 intended to be swivel-mounted with respect to the chassis 7 around a first rotation axis A1 through the first coupling means 8;

a first inner scraper element 9 comprising at least one suitable second scraper portion 10 intended to rest against at least one part of the inner surface 3 of the first disc 1, and one suitable second coupling portion 11 intended to be coupled to the first coupling portion 6 of the first outer scraper element 4 through second coupling means 12;

the first inner scraper element 9 being swivel-mounted with respect to the first outer scraper element 4 around a second rotation axis A2 through the second coupling means 12.

In accordance with the invention and as illustrated in FIGS. 2 to 5, the scraper device is characterized in that it comprises:

a resetting means 13 connected to at least the second coupling portion 11;

in that the resetting means 13 is configured to cause a rotational movement of the first inner scraper element 9 along the second rotation axis A2, so as to press the second scraper portion 10 against the inner surface 3 of the first disc 1, and to cause a rotational movement of the first outer scraper element 4 along the first rotation axis A1 to press the first scraper portion 5 against the outer surface 2 of the first disc 1.

Advantageously, at least the first outer scraper element 4 and the first inner scraper element 9 are connected through the resetting means 13 and the second coupling means 12, so as to centralize the adjustment of at least the first outer scraper element 4 and the first inner scraper element 9, in order to be able to obtain a pressure exerted respectively on the outer surface 2 and the inner surface 3 of the first disc 1 that is identical. Indeed, the resetting means 13 both allows to adjust the pressure of the second scraper portion 10 against the inner surface 3 of the first disc 1 and to adjust the pressure of the first scraper portion 5 against the outer surface 2 of the first disc 1. The pressure exerted respectively on the outer surface 2 and the inner surface 3 of the first disc 1 can thus be identical. This design has the advantage of facilitating the adjustment of the scraper device and of limiting the number of components enabling the adjustment of the pressure of the first scraper portion 5 and the second scraper portion 10 on the first disc 1. The first scraper portion 5 and the second scraper portion 10 are wear parts due to the friction on the first disc 1. The resetting means 13 enables the wear of the first scraper portion 5 and of the second scraper portion 10 to be compensated for and contact with the first disc 1 to be maintained, without the need for human intervention. Finally, this configuration makes it easier to fit and dismantle the scraper device on the agricultural machine. The adjustment of the resetting means 13 is easy and quick.

According to a first embodiment variant not shown, the resetting means 13 is connected by a first end 25 to the second coupling portion 11 and by a second end 26 to the chassis 7 of the agricultural machine.

Advantageously, the first outer scraper element 4 and the first inner scraper element 9 are connected to each other through the resetting means 13 and the second coupling means 12, so as to centralize the adjustment of the first outer scraper element 4 and of the first inner scraper element 9, in order to be able to obtain a pressure exerted respectively on the outer surface 2 and the inner surface 3 of the first disc 1 that is identical. This design is particularly advantageous for an agricultural machine comprising at least one scraper device according to the first embodiment variant for a single disc, namely the first disc 1.

According to a second embodiment variant shown in FIGS. 1 to 5, the scraper device according to the invention additionally comprises a second set E2 for a second disc 14, comprising an outer surface 15 and an inner surface 16.

The second set E2 comprises at least:
- a second outer scraper element 17 comprising at least a suitable third scraper portion 18 intended to rest against at least one part of the outer surface 15 of the second disc 14, and a suitable third coupling portion 19 intended to be mechanically coupled to at least the chassis 7 of the agricultural machine through third coupling means 20, with the first suitable outer scraper element 17 intended to be swivel-mounted with respect to the chassis 7 around a third rotation axis A3 through the third coupling means 20;
- a second inner scraper element 21 comprising at least one suitable fourth scraper portion 22 intended to rest against at least one part of the inner surface 16 of the second disc 14, and one suitable fourth coupling portion 23 intended to be coupled to the third coupling portion 19 of the first outer scraper element 17 through fourth coupling means 24;
- with the second inner scraper element 21 swivel-mounted with respect to the second outer scraper element 17 around a fourth rotation axis A4 through the fourth coupling means 24.

In accordance with this second embodiment variant, the resetting means 13 is connected by a first end 25 to the second coupling portion 11 and by a second end 26 to the fourth coupling portion 23, and the resetting means 13 is configured to cause a rotational movement of the second inner scraper element 21 along the fourth rotation axis A4, so as to press the fourth scraper portion 22 against the inner surface 16 of the second disc 14 and so as to cause a rotational movement of the second outer scraper element 17 along the third rotation axis A3 to press the third scraper portion 18 against the outer surface 15 of the second disc 14.

Advantageously, the first outer scraper element 4 and the first inner scraper element 9, as well as the second outer scraper element 17 and the second inner scraper element 21, are connected to each other through the resetting means 13, the second coupling means 12 and the fourth coupling means 24, so as to centralize the adjustment of the first outer scraper element 4 and of the first inner scraper element 9 and also of the second outer scraper element 17 and of the second inner scraper element 21, in order to be able to obtain a pressure exerted respectively on the outer surface 2 and the inner surface 3 of the first disc 1 and a pressure exerted on the outer surface 15 and the inner surface 16 of the second disc 14 which are identical. Indeed, the resetting means 13 enables the adjustment of the pressure of the second scraper portion 10 against the inner surface 3 of the first disc 1, the adjustment of the pressure of the first scraper portion 5 against the outer surface 2 of the first disc 1, the adjustment of the pressure of the third scraper portion 18 against the outer surface 15 of the second disc 14 and the adjustment of the pressure on the fourth scraper portion 22 against the inner surface 16 of the second disc 14. This design has the advantage of facilitating the adjustment of the scraper device and of limiting the number of components enabling the adjustment of the pressure of the first scraper portion 5 and of the second scraper portion 10 on the first disc 1, and of the pressure of the third scraper portion 18 and of the fourth scraper portion 22 on the second disc 14. The first scraper portion 5, the second scraper portion 10, the third scraper portion 18, and the fourth scraper portion 22 are wear parts, due to friction respectively on the first disc 1 and the second disc 14. The resetting means 13 enables the wear on the first scraper portion 5, the second scraper portion 10, the third scraper portion 18, and the fourth scraper portion 22 to be compensated for, and contact with the first disc 1 or the second disc 14 to be maintained, without the need for human intervention. This design is particularly advantageous for an agricultural machine comprising at least one scraper device according to the second embodiment variant for a pair of discs, namely a first disc and a second disc.

Preferably, the resetting means 13 consists of a single spring of predetermined stiffness.

Advantageously, to adjust the scraper device for a first disc 1 or for a first disc 1 and a second disc 14, only one spring needs to be handled.

In the first embodiment variant, the spring pulls the first inner scraper element 9, which presses against the inner surface 3 of the first disc 1 via the second coupling means 12, preferably a pivot connection. The movement of the first inner scraper element 9 then causes the rotational movement of the first outer scraper element 4, which presses on the outer surface 2 of the first disc 1.

In the second embodiment variant, on the one hand, the spring pulls the first inner scraper element 9, which presses against the inner surface 3 of the first disc 1 via the second coupling means 12, preferably a pivot connection, and on the other hand, the spring pulls the second inner scraper element 21, which presses against the inner surface 16 of the second disc 14 via the fourth coupling means 24, preferably a pivot connection. Then, on the one hand, the movement of the first inner scraper element 9 causes the rotational movement of the first outer scraper element 4, which presses on the outer surface 2 of the first disc 1, and on the other hand, the movement of the second inner scraper element 21 causes the rotational movement of the second outer scraper element 17, which presses on the outer surface 15 of the second disc 14.

Preferably, the stiffness of the spring is selected so as to press the first scraper portion 5 against the outer surface 2 of the first disc 1 and so as to press the second scraper portion 10 against the inner surface 3 of the first disc 1. Preferably, the spring of the resetting means 13 has a stiffness that permanently presses the first scraper portion 5 against the outer surface 2 of the first disc 1 and the second scraper portion 10 against the inner surface 3 of the first disc 1.

A set of several springs with different stiffnesses can be provided to adapt the scraper device to specific working conditions or soils.

The preferable tension spring can be replaced by another component that is equivalent in function.

Preferably, the first scraper portion 5 is fitted in a removable manner relative to the first coupling portion 6 and/or the second scraper portion 10 is fitted in a removable manner relative to the second coupling portion 11 (FIGS. 1 to 7).

Advantageously, the first scraper portion 5 and/or the second scraper portion 10 can be replaced in case of wear.

For example, the first scraper portion 5/the second scraper portion 10 may comprise two spaced apart tabs 39 engaging in two spaced apart holes 40 in the second end 41 of the first coupling portion 6/the second coupling portion 11.

Preferably and alternatively, the first scraper portion 5 and the first coupling portion 6 constitute a one-piece part and/or the second scraper portion 10 and the second coupling portion 11 constitute a one-piece part (FIG. 8).

The first scraper portion 5 and/or the second scraper portion 10 can preferably be made of rubber or metal.

Preferably, the first coupling portion 6 comprises a first aperture 27, and the second coupling portion 11 comprises a first end 28 passing through the first aperture 27 and comprising a first support zone 29 arranged to rest against an outer side 30 of the first coupling portion 6 during the rotational movement of the first inner scraper element 9 along the second rotation axis A2.

Advantageously, during the rotational movement of the first inner scraper element 9 along the second rotation axis A2, the support zone 29 of the first inner scraper element 9 comes to press on the outer surface 30 of the first coupling portion 6 of the first outer scraper element 4. As a result, the first outer scraper element 4 is in turn driven in rotation along the first rotation axis A1 through the first coupling means 8, for example, a pivot connection, to press the first scraper portion 5 against the outer surface 2 of the first disc 1.

Preferably, the first coupling portion 6 comprises a second aperture 31, the second coupling portion 11 comprises the fastening means 32 for the resetting means 13 positioned opposite the second aperture 31, and the resetting means 13 passes through the second aperture 31 and is fastened by its first end 25 to the first fastening means 32.

These first fastening means 32 may consist of a bracket or a tab.

In the second embodiment variant according to the invention, preferably, the stiffness of the spring is chosen so as to press the first scraper portion 5 against the outer surface 2 of the first disc 1, so as to press the second scraper portion 10 against the inner surface 3 of the first disc 1, so as to press the third scraper portion 18 against the outer surface 15 of the second disc 14, and so as to press the fourth scraper portion 22 against the inner surface 16 of the second disc 14. Preferably, the spring of the resetting means 13 has a stiffness that permanently presses the first scraper portion 5 against the outer surface 2 of the first disc 1, the second scraper portion 10 against the inner surface 3 of the first disc 1, the third scraper portion 18 against the outer surface 15 of the second disc 14, and the fourth scraper portion 22 against the inner surface 16 of the second disc 14.

In the second embodiment variant according to the invention, preferably, the third scraper portion 18 is fitted in a removable manner relative to the third coupling portion 19 and/or the fourth scraper portion 22 is fitted in a removable manner relative to the fourth coupling portion 21.

Advantageously, the third scraper portion 18 and/or the fourth scraper portion 22 can be replaced in case of wear.

For example, the third scraper portion 18/the fourth scraper portion 22 may comprise two spaced apart tabs 39 engaging in two spaced apart holes 40 in the second end 41 of the third coupling portion 19/fourth coupling portion 23.

Preferably and alternatively, the third scraper portion 18 and the third coupling portion 19 constitute a one-piece part and/or the fourth scraper portion 22 and the fourth coupling portion 21 constitute a one-piece part.

In the second embodiment variant according to the invention, preferably, the third coupling portion 19 comprises a third aperture 33, and the fourth coupling portion 21 comprises a first end 34 passing through the third aperture 33 and comprising a second support zone 35 arranged to rest against an outer face 36 of the third coupling portion 19 during the rotational movement of the second inner scraper element 17 along the fourth rotation axis A4.

Advantageously, during the rotational movement of the second inner scraper element 21 along the fourth rotation axis A4, the support zone 35 of the second inner scraper element 21 comes to press on the outer side 36 of the third coupling portion 19 of the second outer scraper element 17. As a result, the second outer scraper element 17 is in turn driven in rotation along the third rotation axis A3 through the third coupling means 20, for example, a pivot connection, to press the third scraper portion 18 against the outer surface 15 of the second disc 14.

In the second embodiment variant according to the invention, preferably, the third coupling portion 19 comprises a fourth aperture 37, the fourth coupling portion 21 comprises second fastening means 38 for the resetting means 13 positioned opposite the fourth aperture 37, and the resetting means 13 passes through the fourth aperture 37 and is fastened by its second end 26 to the second fastening means 38.

These second fastening means 38 may consist of a bracket or a tab.

Figure 1:
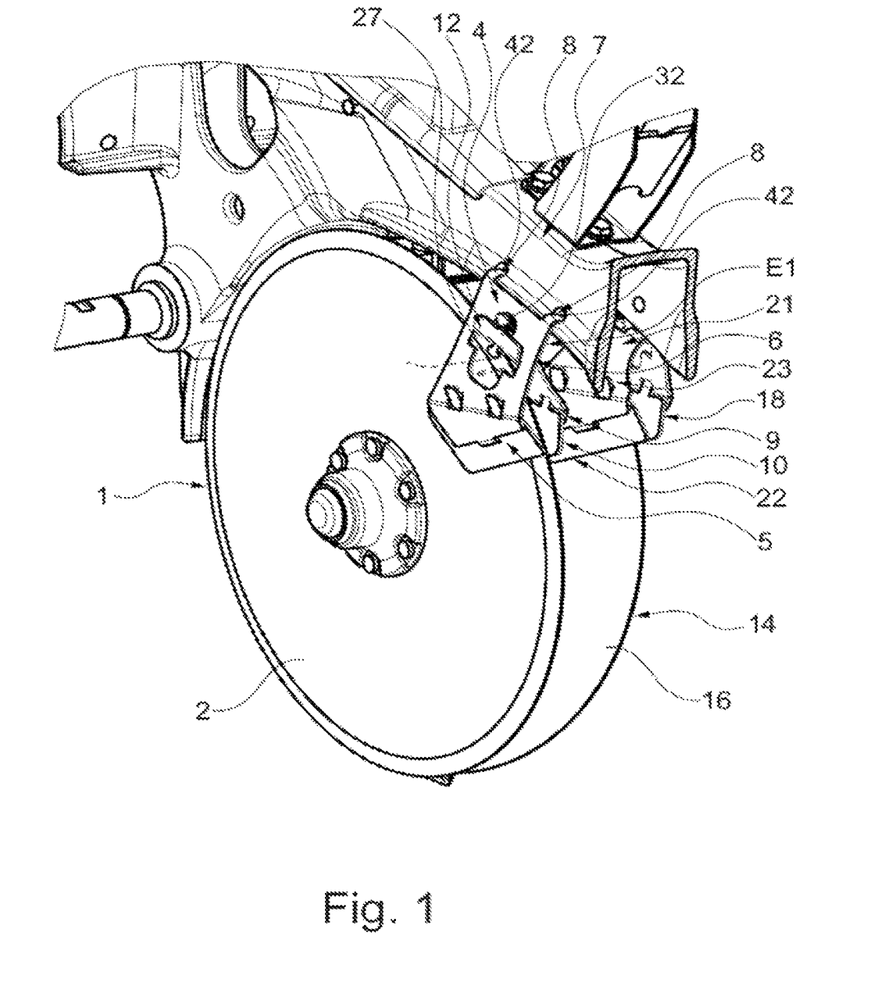
FIG. 1 represents a perspective view of a scraper device according to a second variant of the invention coupled to the chassis of an agricultural machine according to the invention.
Figure 2:
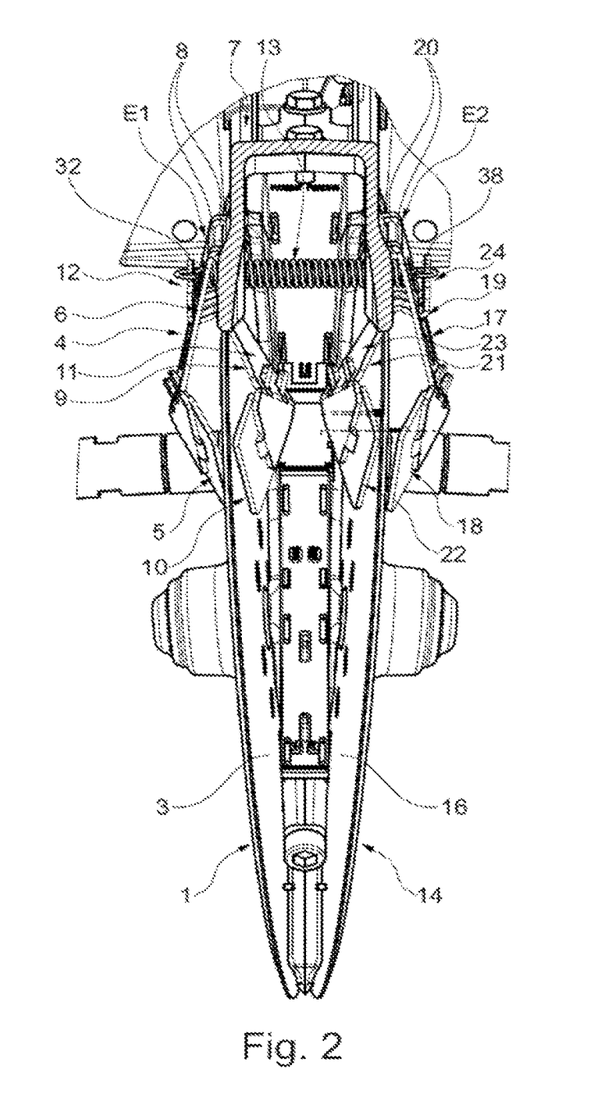
FIG. 2 shows a front view of the scraper device shown in FIG. 1.
Figure 3:
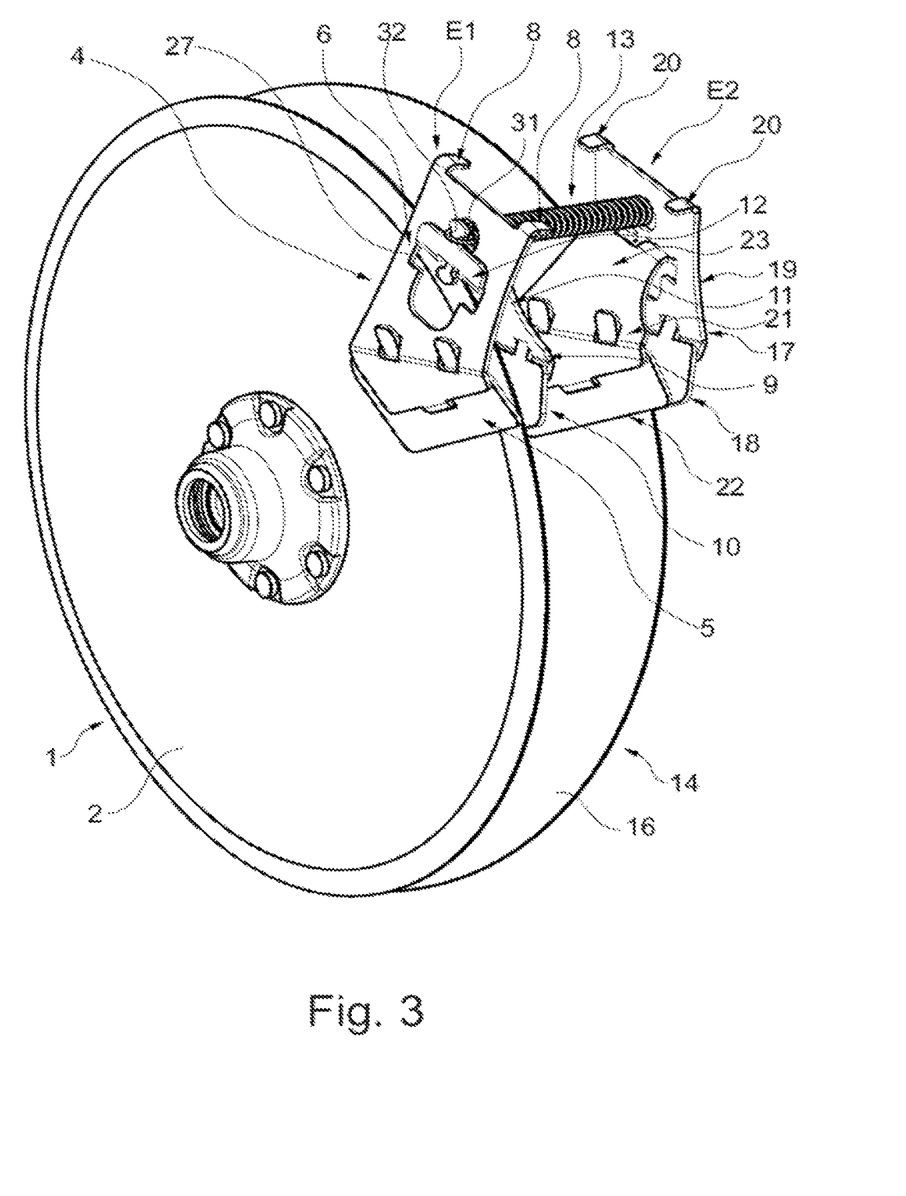
FIG. 3 shows a perspective view of a scraper device according to the second variant of the invention associated with a first disc and a second disc.
Figure 4:
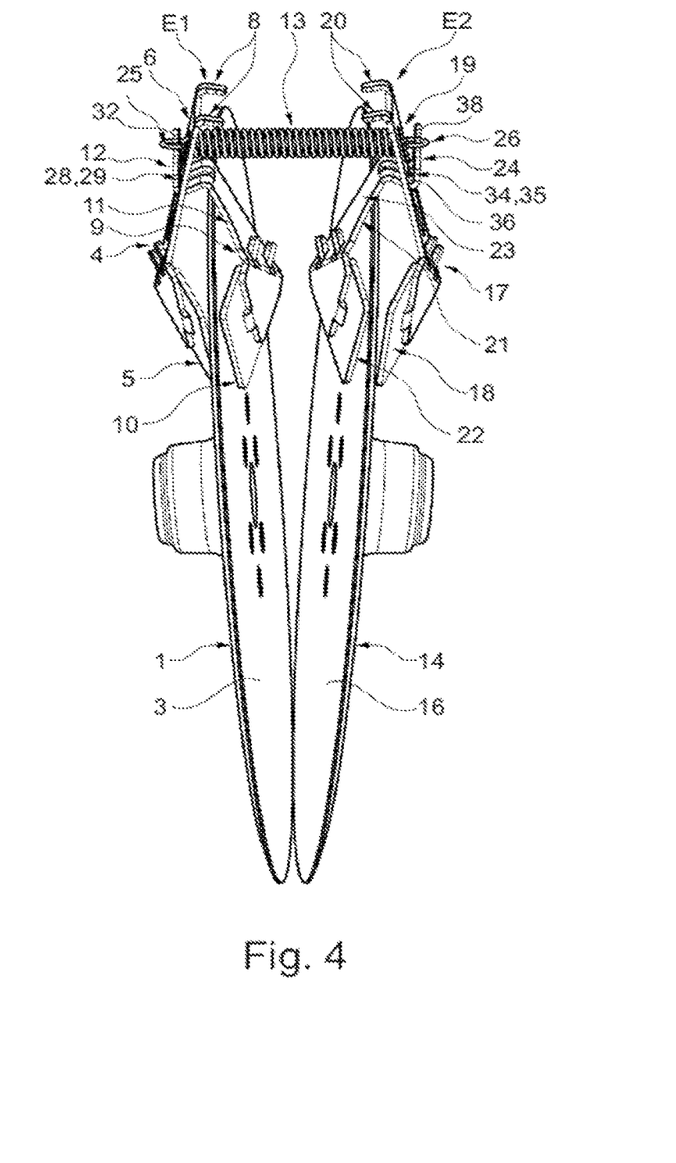
FIG. 4 shows a front view of the scraper device shown in FIG. 3.
Figure 5:
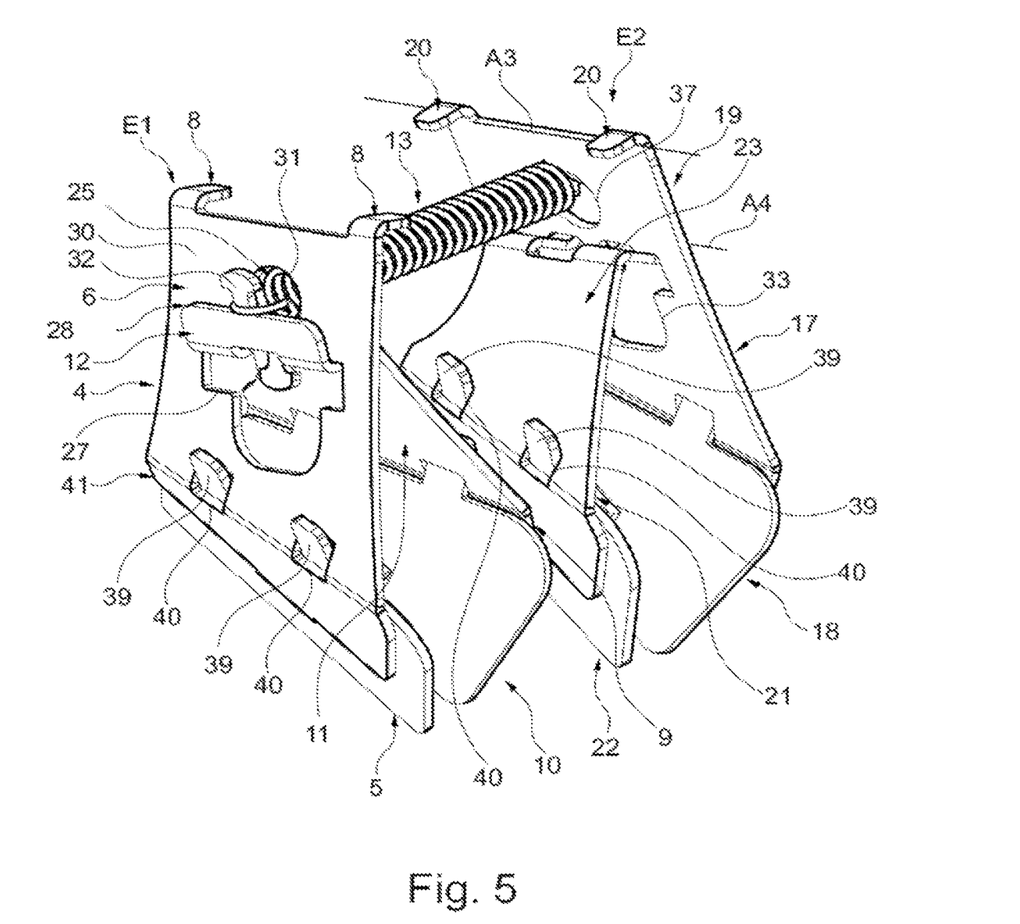
FIG. 5 shows a perspective view of a scraper device according to the second variant of the invention for a first disc and a second disc.

Preferably, and as illustrated in FIG. 1, the first/third coupling means 8, 20 may comprise two upper brackets that fit into two holes 42 provided in the chassis 7 of the agricultural machine. The resetting means 13, preferably a spring, enables the brackets to be pressed against the edge of these holes 42, so that they remain in place. To dismantle the brackets from the holes 42 of the chassis 7, it is sufficient to remove the resetting means 13 and the first/second outer scraper element 4, 17 are free with respect to the chassis 7. Other technical solutions that would have the same pivot function can be considered, such as, for example, a threaded hole and a partially screwed-in screw that passes through the first/second outer scraper element 4, 17 to provide clearance and thus pivoting.

The invention also concerns an agricultural machine comprising at least:
- a first disc 1;
- a chassis 7;
- at least one scraper device.

In accordance with the invention, the agricultural machine is characterized in that the scraper device complies with the invention and is as previously described.

Preferably, the first disc 1 is positioned between the first outer scraper element 4 and the first inner scraper element 9.

The invention also concerns an agricultural machine comprising at least:
- a first disc 1 and a second disc 14 positioned opposite each other;
- a chassis 7;
- at least one scraper device for the first disc 1 and the second disc 14;
- the agricultural machine is characterized in that the scraper device is according to the second embodiment variant of the invention described above.

Preferably, the first disc 1 is positioned between the first outer scraper element 4 and the first inner scraper element 9, and the second disc 14 is positioned between the second outer scraper element 17 and the second inner scraper element 21 (FIGS. 1 to 4).

Advantageously, in this case, the agricultural machine comprises at least one pair of discs, namely the first disc 1 and the second disc 14, and a scraper device according to the second embodiment variant is associated with this pair.

Preferably, the first disc 1 and the second disc 14 are oriented in a V-shape to open up the soil.

The agricultural machine enables the soil to be worked using one or more discs fitted alone or in pairs.

Preferably, the agricultural machine is an agricultural seeder.

It can be a seeder for grains, such as, for example, wheat, barley, rape, etc., also known as a seed drill.

It can be a single-grain seeder for corn, beet, etc., also known as precision seed drills or row seed drills.

Of course, the invention is not limited to the embodiments described and shown in the attached drawings. Modifications remain possible, in particular as regards the composition of the various elements or by substitution of technical equivalents without departing from the scope of protection of the invention.

The invention claimed is:

1. A scraper device for at least one disc of an agricultural machine, comprising:
    a first set for a first disc comprising an outer surface and an inner surface, the first set comprising:
        a first outer scraper element comprising a first scraper portion which rests against at least one part of the outer surface of the first disc and a first coupling portion mechanically coupled to a chassis of the agricultural machine through first coupling means, with the first outer scraper element swivel-mounted with respect to the chassis around a first rotation axis through the first coupling means; and
        a first inner scraper element comprising a second scraper portion which rests against at least one part of the inner surface of the first disc and a second coupling portion coupled to the first coupling portion of the first outer scraper element through second coupling means;
    the first inner scraper element being swivel-mounted with respect to the first outer scraper element around a second rotation axis through the second coupling means;
    a second set for a second disc comprising an outer surface and an inner surface, the second set comprising:
        a second outer scraper element comprising a third scraper portion which rests against at least one part of the outer surface of the second disc and a third coupling portion mechanically coupled to the chassis of the agricultural machine through third coupling means, second outer scraper element being swivel-mounted with respect to the chassis around a third rotation axis by the third coupling means; and
        a second inner scraper element comprising a fourth scraper portion which rests against at least one part of the inner surface of the second disc and a fourth coupling portion coupled to the third coupling portion of the first second outer scraper element by fourth coupling means;
    the second inner scraper element being swivel-mounted with respect to the second outer scraper element around a fourth rotation axis by the fourth coupling means; and
    a resetting means connected by a first end to the second coupling portion and by a second end to the fourth coupling portion;
    wherein the resetting means is configured to cause a rotational movement of the first inner scraper element along the second rotation axis, so as to press the second scraper portion against the inner surface of the first disc and so as to cause a rotational movement of the first outer scraper element along the first rotation axis to press the first scraper portion against the outer surface of the first disc,
    wherein the resetting means is configured to cause a rotational movement of the second inner scraper element along the fourth rotation axis, so as to press the fourth scraper portion against the inner surface of the second disc and so as to cause a rotational movement of the second outer scraper element along the third rotation axis to press the third scraper portion against the outer surface of the second disc,
    wherein the first coupling portion comprises a first aperture and a second aperture, the second aperture being disposed above the first aperture, the first aperture being larger than the second aperture,
    wherein the second coupling portion comprises a first end passing through the first aperture and comprising a first support zone positioned to come to rest against an outer side of the first coupling portion during the rotational movement of the first inner scraper element along the second rotation axis, and fastening means extending from the first end and positioned opposite the second aperture, and
    wherein the resetting means passes through the second aperture and the first end of the resetting means is fastened to the fastening means.

2. The scraper device according to claim 1, wherein the resetting means consists of a single spring of predetermined stiffness.

3. The scraper device according to claim 2, wherein the stiffness of the spring is chosen so as to press the first scraper portion against the outer surface of the first disc, so as to press the second scraper portion against the inner surface of the first disc, so as to press the third scraper portion against the outer surface of the second disc, and so as to press the fourth scraper portion against the inner surface of the second disc.

4. The scraper device according to claim 1, wherein at least one of the first scraper portion is fitted in a removable manner relative to the first coupling portion and the second scraper portion is fitted in a removable manner relative to the second coupling portion.

5. The scraper device according to claim 1, wherein at least one of the third scraper portion is fitted in a removable manner relative to the third coupling portion and the fourth scraper portion is fitted in a removable manner relative to the fourth coupling portion.

6. An agricultural machine comprising the scraper device is according to claim 1.

* * * * *